United States Patent Office 2,909,532
Patented Oct. 20, 1959

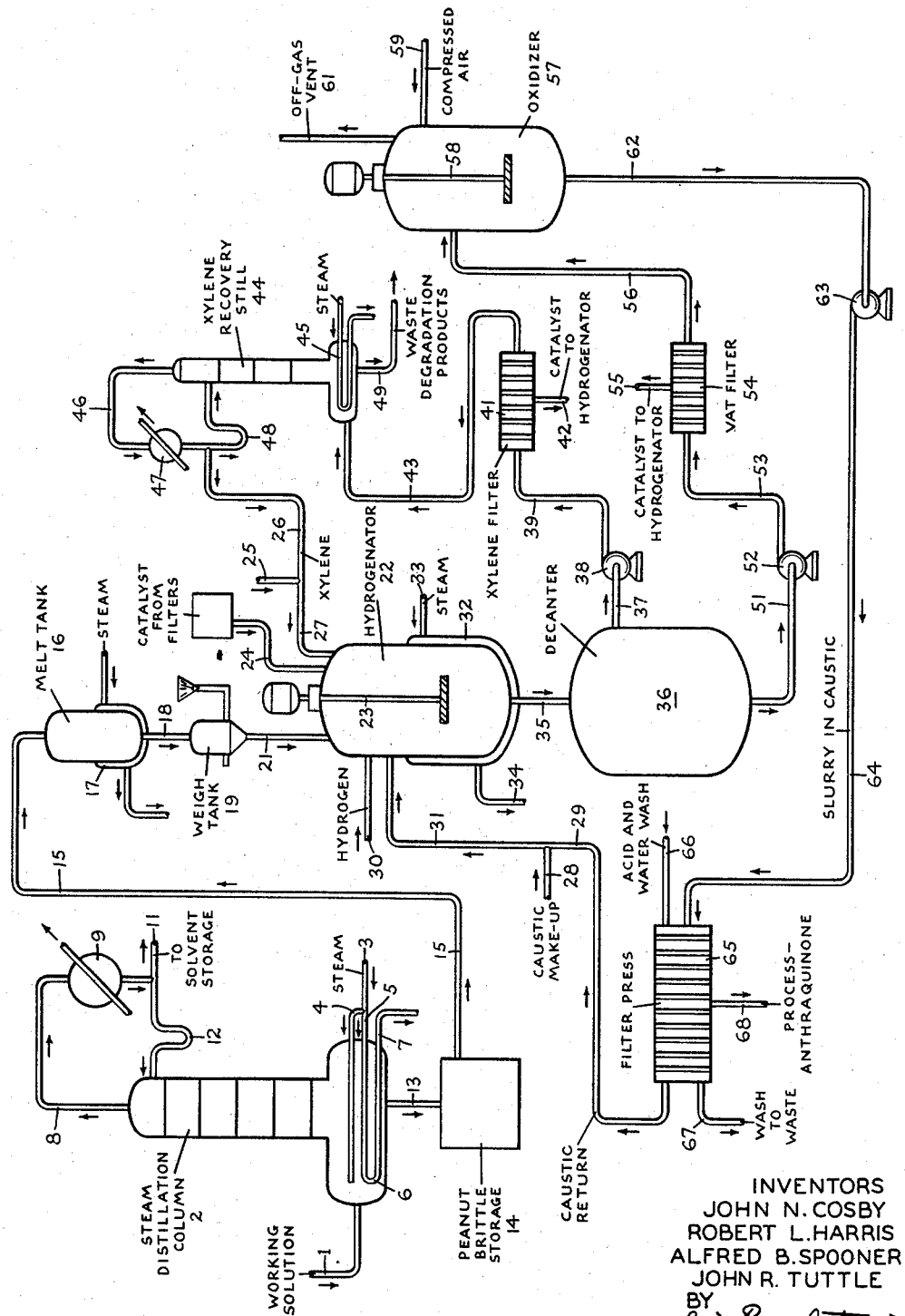

2,909,532

TREATMENT OF HYDROGEN PEROXIDE WORKING SOLUTION CONTAINING ANTHRAQUINONE DEGRADATION PRODUCTS

John N. Cosby and Robert L. Harris, Morris Township, Morris County, Alfred B. Spooner, Orange, and John R. Tuttle, Summit, N.J., assignors to Allied Chemical Corporation, a corporation of New York Application February 12, 1958, Serial No. 714,766

3 Claims. (Cl. 260—369)

This invention relates to the hydrogen peroxide process by reduction of an anthraquinone compound in an organic solvent and oxidation of the resultant hydroanthraquinone compound and more particularly refers to a new and improved method of removing anthraquinone degradation products produced as by-products in the hydrogen peroxide process.

The anthraquinone process for the production of hydrogen peroxide is described in the literature and is in commercial operation and generally involves circulating an anthraquinone compound in solution in a solvent medium, which solution is termed working solution, and subjecting the working solution to hydrogenation to convert the anthraquinone compound to the corresponding hydroanthraquinone compound and then oxidizing the hydroanthraquinone compound to the initial anthraquinone compound and concomitantly hydrogen peroxide which later is removed by extraction with water and the working solution recycled for further hydrogenation. The process of producing hydrogen peroxide via an anthraquinone compound is described in U.S. Patent 2,739,042 issued March 20, 1956 and in U.S. application Serial No. 436,491 filed June 14, 1954 and entitled "Manufacture of Hydrogen Peroxide." The anthraquinone compounds constituting about 10–20% of the working solution include anthraquinone and derivatives of anthraquinone such as methyl-, ethyl-, propyl-, and butyl anthraquinone. The solvent medium constituting about 80–90% of the working solution is desirably a mixture of two or more constituents as described, for example, in co-pending U.S. application Serial No. 427,876, filed May 5, 1954 and entitled, "Solvent Medium For The Anthraquinone Process For The Production of Hydrogen Peroxide." Aromatic compounds such as benzene, toluene and xylene are examples of the solvent constituents suitable for maintaining the anthraquinone compound in solution. Alcohols having from about 5 to 12 carbon atoms in the molecule, as for example amyl alcohol, cyclohexanol, methyl cyclohexanol, dimethyl cyclohexanol, octyl alcohol, nonyl alcohol and decyl alcohol may be employed as the solvent constituent for maintaining the anthrahydroquinone compound in solution. A ketone such as acetophenone, a synergistic solvent, may be used as the third constituent of the solvent medium. Illustrative of the composition of working solution would be 10–25% 2-ethylanthraquinone, 10–30% xylene, 10–35% octanol-2 and 25–60% acetophenone.

Working solution, an anthraquinone compound dissolved in organic solvents, is hydrogenated at a temperature of about 15–50° C. under substantially atmospheric pressure of 1–5 p.s.i.g. in the presence of a hydrogenation catalyst such as Raney nickel or palladium supported on a suitable medium, as for example, activated carbon or alumina, in an amount of approximately 0.01–10% catalyst by weight of the quinone present in the working solution, thereby reducing the anthraquinone compound to the hydroanthraquinone compound. After hydrogenation, catalyst is separated from the working solution, which latter is then oxidized by passing oxygen or oxygen-containing gas such as air in intimate contact with the working solution at room temperatures or higher, preferably about 30–35° C. Hydrogen peroxide is separated from the products of the oxidation reaction by scrubbing them with water. After extraction of hydrogen peroxide, the working solution is recycled for further reaction with hydrogen.

In the catalytic reduction-oxidation anthraquinone process for the production of hydrogen peroxide as described above, there is a small but continuous formation in the circulating solution of by-products from the anthraquinone compound used in the process. These by-products, or anthraquinone degradation products, are non-volatile i.e. they are not separable from the other components by distillation alone. While the presence of a minor amount of these degradation products in the working solution does not appear to interfere with the operation of the steps of the hydrogen peroxide process and the output of product may be maintained by introduction of additional anthraquinone compound into the system from time to time, the formation of these products does represent a process cost as to loss of "process-anthraquinone"; and sooner or later working solution must be purged from the system to prevent excessive build-up of the degradation products; and without some practical method for reprocessing this working solution its entire content of residual process-anthraquinone would be lost, representing a substantial cost item.

An object of the present invention is to provide an efficient method of isolating and removing anthraquinone degradation products from the working solution employed in the hydrogen peroxide process.

Another object of the present invention is to provide a method of converting the anthraquinone degradation products into reusable anthraquinone material suitable for production of hydrogen peroxide.

Other objects and advantages of the invention will be apparent from the following description and accompanying drawing.

In accordance with the present invention, working solution comprising an anthraquinone compound, preferably ethylanthraquinone, dissolved in an organic solvent, desirably a mixed solvent of an aromatic compound and an alcohol, preferably a mixture of xylene, octanol and acetophenone, said working solution having been subjected to repeated reductions and oxidations for the production of hydrogen peroxide and containing anthraquinone degradation products resulting from the repeated reductions and oxidations in the production of hydrogen peroxide, is treated to remove the organic solvent of the working solution leaving as residue a mixture of anthraquinone compound and anthraquinone degradation products, adding to the residue an aqueous alkali, preferably sodium hydroxide, in stoichiometric excess, preferably 10–150% excess alkali, and a volatile solvent such as xylene or benzene in which anthraquinone compound will dissolve, preferably in an amount of 50–150% by weight of said residue, passing hydrogen in intimate contact with the mixture of residue, aqueous alkali and volatile solvent at a temperature within the range of 20°–90° C., preferably 50°–70° C., in the presence of a hydrogenating catalyst, preferably a palladium catalyst, for a sufficient length of time to reduce anthraquinone compound to the anthrahydroquinone form and to react anthrahydroquinone with alkali to produce water-soluble alkali anthrahydroquinone, separating the mixture into an aqueous layer containing water-soluble alkali anthrahydroquinone and a volatile solvent layer containing anthraquinone degradation products, passing said volatile solvent containing anthraquinone degradation products through a filter to remove catalyst particles suspended therein, returning the catalyst for further hydrogenation of additional residue, separating the volatile solvent from the anthraquinone degradation products, recirculating the volatile solvent for admixture with additional residue, passing the aqueous layer through a filter to remove catalyst particles suspended therein, returning the catalyst for further hydrogenation of additional residue, oxidizing the water-soluble alkali anthrahydroquinone to convert the hydroanthraquinone to anthraquinone insoluble in water, preferably by passing compressed air in intimate contact with the aqueous layer, separating the water-insoluble anthraquinone from the aqueous liquor, and returning the aqueous liquor together with additional alkali for admixture with additional residue. In an alternative method of operation reduction of the residue may be effected by means other than passing hydrogen gas in contact with the residue as for example by the addition of sodium hydrosulfite or other reducing agent.

The working solution employed in the manufacture of hydrogen peroxide contains an anthraquinone compound as for example ethylanthraquinone as a solute and a mixed solvent, e.g. a mixture of an aromatic compound such as xylene, an alcohol such as octyl alcohol and a ketone such as acetophenone. The working solution is a valuable material costing more on a pound basis than the hydrogen peroxide product and represents an appreciable item of the cost of the hydrogen peroxide plant. Consequently it is important to use the working solution to the maximum extent possible because loss of working solution increases the cost of producing hydrogen peroxide. In the course of repeated reductions and oxidations of the working solution, usually one thousand or more cycles, the working solution gradually undergoes changes. One of these changes is the formation of tetrahydroanthraquinone which is treated in application Serial No. 633,324 filed January 9, 1957. The tetrahydroanthraquinone while not as efficient as anthraquinone in producing hydrogen peroxide nevertheless does reduce and oxidize to produce hydrogen peroxide. In addition to nuclear hydrogenation of anthraquinone to tetrahydroanthraquinone a small amount of the valuable anthraquinone compound in each cycle of operation deteriorates and forms a by-product which is totally ineffective in the production of hydrogen peroxide. While small amounts of these degradation products may be tolerated, repeated cyclic treatment of the working solution, one thousand or more times, causes an accumulation of such degradation products in the working solution so as to constitute not only a loss of valuable anthraquinone but also a serious drop in the hydrogen peroxide capacity of the unit. Of course the entire working solution could be purged from the system and new working solution introduced, but this would represent a large item of expense. The present invention is particularly directed to isolating and separating these degradation products from the used working solution to permit reuse of the working solution in an efficient manner. Also surprisingly and unexpectedly we found that in the course of our treatment of the used working solution to remove degradation products, an appreciable amount of the degradation products were converted to useful anthraquinone compound which could be employed as a constituent of the working solution and when subjected to oxidation and reduction produced hydrogen peroxide. We have isolated these anthraquinone degradation products and found them to be a complex mixture of chemical compounds which are non-volatile and not separable from the other components by distillation alone.

The accompanying drawing diagrammatically illustrates one method of carrying out the invention.

Working solution which has been repeatedly subjected to reduction and oxidation for the production of hydrogen peroxide is introduced through line 1 into steam distillation column 2. For illustrative purposes the composition of a typical spent working solution would be 10-30% xylene, 15-35% octanol, 25-40% acetophenone. The solvent mixture will contain as solute "process-anthraquinone" in an amount of about 5 to 15% by weight of the working solution and by which we mean anthraquinone materials which function in the cyclic reduction and oxidation operation to produce hydrogen peroxide and which, in the case of ethylanthraquinone starting material, include ethylanthraquinone and its process modifications, ethylhydroanthraquinone, tetrahydroethylanthraquinone and tetrahydroethylhydroanthraquinone. In addition the working solution will contain about 5 to 10% by weight of the working solution of anthraquinone degradation products which do not function to produce hydrogen peroxide. The amount of degradation products in the working solution will vary depending upon the extent of usage of the working solution but it will be evident that the degradation products constitute a material portion of the original anthraquinone content in the working solution. The alkali extraction of anthrahydroquinone from used working solutions has consistently been complicated by difficulty in separation of the organic and aqueous phases and this emulsifying tendency presents a serious problem in the separation of anthraquinone degradation products from the working solution. The working solution solvent in addition to its hydrocarbon component contains oxygen compounds and it is these compounds which, due to their density, water-miscibility properties, are responsible for the emulsion and other phase separation difficulties. To obviate these difficulties we have found it necessary to first remove the volatile solvents specifically xylene, octanol and acetophenone from the working solution and leave as residue process-anthraquinone and anthraquinone degradation products. Separation of the volatile solvent may be readily and conveniently accomplished in steam distillation column 2 into which steam from an external source flows through line 3 and enters column 2 through line 4 in direct contact with the working solution contained in the column. A portion of the steam may be introduced through line 5 passing through steam coil 6 in indirect heat exchange with the liquid contents of column 2 to provide additional heat thereby and then discharge through line 7. Volatile solvent vapors are released from the top of steam distillation column 2 through line 8 condensed in condenser 9 and the condensate directed through line 11 to solvent storage. For temperature control and reflux, a portion of the condensate is returned via line 12 to the top of column 2. Steam distillation column 2 is ordinarily operated under atmospheric pressure but subatmospheric or superatmospheric pressure may be employed. The temperature in the column will depend upon the boiling points of the volatile solvents; ordinarily the temperature at the top of the column will be about 93° C. to 97° C. and at the bottom of the column about 94° C. to 99° C. The residue composed of process-anthraquinone is discharged from the bottom of column 2 through line 13 into storage tank 14. The residue is a solid at normal temperature and resembles peanut brittle.

The "peanut brittle" from storage tank 14 is sent through line 15 into melt tank 16 equipped with steam jacket 17 to provide heat for melting the peanut brittle. The melt point of the peanut brittle is low and will usually melt at a temperature of 30° C. to 60° C. The melted peanut brittle then flows through line 18 into weigh tank 19 and a weighted amount flows down through line 21 into hydrogenator 22. The hydrogenator is a stainless steel vessel equipped with stirrer 23 preferably of a turbo mixer type to promote gas dispersion. An anthraquinone catalyst from an external source or catalyst recovered in the process is charged into hydrogenator 22 through line 24. The hydrogenation catalyst is preferably the same catalyst as is used in the reducing operation in the hydrogen peroxide process, namely palladium deposited on a solid support such as activated carbon or aluminum. The amount of catalyst is usually from about 1 to 5% by weight of the peanut brittle.

Solvent from an external source entering through line 25 or solvent recovered in the system and entering through line 26 is introduced into hydrogenator 22 through line 27. Xylene and benzene have been found to be good practical solvents in reactor 22 although any liquid solvent boiling in the range of about 50–200° C. in which the anthraquinone degradation products will dissolve may be employed. Xylene is the preferred solvent because it was found to be a good solvent for the anthraquinone degradation products, dissolves sufficient process-anthraquinone for rapid hydrogenation, allows for clean phase-separation and is readily recoverable by steam distillation of the solution containing the anthraquinone degradation products. Generally an amount of solvent of from 50 to about 150% by weight of the peanut brittle, preferably about an amount equal to the weight of the peanut brittle will be found to give efficient operation.

Aqueous caustic such as a solution of sodium hydroxide or potassium hydroxide from an external source entering through line 28 or recovered caustic solution entering through line 29 is introduced through line 31 into hydrogenator 22. The concentration of caustic in the aqueous solution may vary from about 1.0 to 4.0 normality, preferably a more concentrated caustic of from 2.0 to 4.0 normality is employed. The amount of caustic should be in stoichiometric excess within the range of about 10 to 200% excess, preferably about 50–150% excess caustic. The excess caustic insures complete solution of the hydroquinones and aids in the separation of layers in the reactor and also facilitates separation of catalyst. Since the alkali is recyclable in the process the use of excess caustic does not add to the cost of the operation.

Preparatory to hydrogenation, air is evacuated from hydrogenator 22 which is then filled with nitrogen through line 30. Reactor 22 is then flushed with hydrogen entering through line 30 and the flushed gases discharge through line 24. The contents of reactor 22 are heated to a temperature of about 20–90° C., preferably about 40–70° C. by means of steam entering steam jacket 32 through line 33 and discharging through line 34. The reactor is then filled with hydrogen under pressure of about 30 to 100 p.s.i.g. preferably about 40–80 p.s.i.g. and rapid agitation started by rotation of stirrer 23 and the course of the reaction followed by the decrease in hydrogen pressure. The end of the reaction is apparent when the pressure ceases to fall.

When the charge has been totally hydrogenated it is dropped through line 35 into the closed decanter 36 wherein upon settling, usually 10 to 30 minutes is adequate, there is formed an upper solvent layer containing the degradation products and a lower aqueous layer containing the water-soluble alkali anthrahydroquinone. The upper solvent layer containing the degradation product is withdrawn from the upper portion of decanter 36 through line 37 and forced by means of pump 38 through line 39 into filter 41 wherein suspended catalyst is separated. The filtered catalyst is discharged from filter 41 through line 42 and returned to hydrogenator 22 for reduction of an additional batch of residue.

The filtrate is directed through line 43 to solvent recovery still 44 provided with steam coil 45 to supply heat to vaporize the solvent. Solvent vapors released from the top of still 44 through line 46 are condensed in condenser 47 and the distillate sent to storage or returned to hydrogenator 22 via lines 26 and 27. A portion of the condensate may be returned through line 48 to the top of still 44. The bottoms from still 44 contain the degradation products and are discharged through line 49. The degradation products have the appearance of a very viscous dark brown oil.

The aqueous vat layer collected in the bottom of decanter 36 is withdrawn through line 51 and sent by means of pump 52 through line 53 into filter 54 to remove suspended catalyst which latter may be sent through line 55 to hydrogenator 22 for reuse.

The aqueous layer from filter 54 is directed through line 56 into oxidizer 57 provided with a turbo mixer type stirrer 58 to promote gas dispersion and to maintain a handleable slurry of the precipitating anthraquinone solids. Oxidation is accomplished by the introduction of oxygen or oxygen-containing gas, preferably air, under superatmospheric pressure of about 30–100 p.s.i.g. through line 59 in intimate contact with the liquor in oxidizer 57. An oxidizing catalyst is unnecessary since ordinarily oxidation proceeds rapidly in the absence of a catalyst. Oxidation is completed when no further precipitation occurs and this is accomplished in about 30 to 60 minutes. Although oxidation may be effected at lower and higher temperatures, say 0–100° C., the oxidation is usually conveniently carried out at ordinary temperatures of about 20–40° C. Inert and unreacted gases are vented from oxidizer 57 through line 61.

After oxidation, the oxidized aqueous layer which is a slurry of anthraquinone in caustic solution is discharged from oxidizer 57 through line 62 and forced by pump 63 through line 64 into filter press 65 for separation of the precipitated solids. Caustic solution from filter press 65 may be sent to storage or returned via line 29 to hydrogenator 22. The solids may be washed with dilute acid and water entering through line 66 and the washed waters discharged from the filter press 65 through line 67 sent to waste. The washed precipitated solids are discharged from filter press 65 through line 68 and may be combined with solvent recovered from steam distillation column 2 through line 11 to form working solution for use in the hydrogen peroxide process or if desired the solids may be subjected to a dehydrogenation treatment to convert tetrahydroanthraquinone contained therein to anthraquinone and the resultant product then combined with solvent to form working solution.

The following example illustrates the present invention. A working solution consisting of 14 parts by weight ethylanthraquinone, 21 parts xylene, 31 parts octyl alcohol, 34 parts acetophenone is subjected to repeated reductions and oxidations in the cyclic process for the production of hydrogen peroxide. The anthraquinone solute in the working solution became degraded to an extent that 30.5% of the initial anthraquinone solute was converted to degradation products ineffective for production of hydrogen peroxide and the remainder of the anthraquinone solute, namely 69.5% constituted process-anthraquinone comprising 36% ethylanthraquinone and 64% tetrahydroethylanthraquinone.

The used working solution is subjected to steam distillation to remove the xylene, octanol and acetophenone solvents leaving as residue a mixture of process-anthraquinone and anthraquinone degradation products which on solidification have the appearance of peanut brittle. This peanut brittle is introduced into a reaction vessel equipped with a turbo mixer together with an equal amount by weight of xylene, 2.5% by weight based on the peanut brittle of palladium on carbon catalyst and four times by weight based on the peanut brittle of 3.0 normal aqueous sodium hydroxide solution. After purging air from the reaction vessel the reactor is filled with hydrogen to 60 p.s.i.g. and the contents heated to a temperature of 60° C. The contents are agitated to effect hydrogenation and when the pressure ceases to fall the stirrer is stopped. The contents are permitted to settle to form an upper xylene layer containing anthraquinone degradation products and a lower aqueous layer containing water-soluble alkali anthraquinone. The xylene layer is separated and filtered to remove suspended catalyst and the filtrate subjected to distillation to recover the xylene. The aqueous layer is filtered to remove suspended catalyst and then subjected to oxidation by passing compressed air at a pressure of 45 p.s.i.g. in intimate contact with the aqueous layer at a temperature of 35° C. The oxidized aqueous layer which is a slurry of precipitated solids is filtered and the filter cake washed with dilute acid and water. The washed solids are process-anthraquinone and are equal to 109% of the initial anthraquinone in the used working solution.

Although certain preferred embodiments of the invention have been disclosed for purpose of illustration it will be evident that various changes and modifications may be made therein without departing from the scope and spirit of the invention.

We claim:

1. A process for the treatment of a working solution comprising an anthraquinone compound dissolved in an organic solvent, said working solution having been subjected to repeated reductions and oxidations for the production of hydrogen peroxide and containing anthraquinone degradation products and also tetrahydroanthraquinone compound resulting from repeated reductions and oxidations in the production of hydrogen peroxide, which comprises removing the organic solvent from the working solution leaving as residue a mixture of anthraquinone compound, tetrahydroanthraquinone compound and anthraquinone degradation products, adding to the residue a stoichiometric excess of aqueous alkali and a volatile hydrocarbon solvent boiling in the range of about 50-200° C. in which anthraquinone compound and tetrahydroanthraquinone compound will dissolve, subjecting the resultant mixture to hydrogenation to reduce anthraquinone and tetrahydroanthraquinone compounds to the anthrahydroquinone forms and to react anthrahydroquinone with alkali to produce water-soluble alkali anthrahydroquinones, separating the mixture into an aqueous layer containing water-soluble alkali anthrahydroquinones and a volatile solvent layer containing anthraquinone degradation products, separating the volatile solvent from the anthraquinone degradation product, oxidizing the water-soluble alkali anthrahydroquinones to convert the anthahydroquinones to anthraquinones insoluble in water, and separating and recovering the water-insoluble anthraquinones from the aqueous liquor.

2. A process for the treatment of a working solution comprising an alkyl anthraquinone compound dissolved in a mixed solvent containing an aromatic compound and an alcohol having 5-12 carbon atoms in the molecule, said working solution having been subjected to repeated reductions and oxidations for the production of hydrogen peroxide and containing anthraquinone degradation produces and also tetrahydroanthraquinone compound resulting from repeated reductions and oxidations in the production of hydrogen peroxide, which comprises removing the organic solvent from the working solution leaving as residue a mixture of anthraquinone compound, tetrahydroanthraquinone compound and anthraquinone degradation products, adding to the residue aqueous alkali in stoichiometric excess of 10-150% excess alkali and a volatile hydrocarbon solvent boiling in the range of about 50-200° C. in which anthraquinone compound and tetrahydroanthraquinone compound will dissolve in an amount of 15-150% by weight of said residue, adding soldium hydrosulfite to the resultant mixture to affect reduction of the anthraquinone and tetrahydroanthraquinone compounds to the anthrahydroquinone forms and to react anthrahydroquinones with alkali to produce water-soluble alkali anthrahydroquinones, separating the mixture into an aqueous layer containing water-soluble alkali anthrahydroquinones and a volatile solvent layer containing anthraquinone degradation products, separating the volatile solvent from the anthraquinone degradation products, oxidizing the water-soluble alkali anthrahydroquinones to convert the anthrahydroquinones to anthraquinones insoluble in water, and separating and recovering the water-insoluble anthraquinones from the aqueous liquor.

3. A process for the treatment of a working solution comprising an alkyl anthraquinone compound dissolved in a mixed solvent containing an aromatic compound and an alcohol having 5-12 carbon atoms in the molecule, said working solution having been subjected to repated reductions and oxidations for the production of hydrogen peroxide and containing anthraquinone degradation products and also tetrahydroanthraquinone compound resulting from repeated reductions and oxidations in the production of hydrogen peroxide, which comprises removing the organic solvent from the working solution leaving as residue a mixture of anthraquinone compound, tetrahydroanthraquinone compound and anthraquinone degradation products, adding to the residue aqueous alkali in stoichiometric excess of 10-150% excess alkali and a volatile hydrocarbon solvent boiling in the range of about 50-200° C. in which anthraquinone compound and tetrahydroanthraquinone compound will dissolve in an amount of 50-150% by weight of said residue, passing hydrogen in intimate contact with the mixture of residue, aqueous alkali and volatile solvent at a tempertaure within the range of 20°-90° C. in the presence of a palladium catalyst to reduce anthraquinone and tetrahydroanthraquinone compounds to the anthrahydroquinone forms and to react anthrahydroquinones with alkali to produce water-soluble alkali anthrahydroquinones, separating the mixture into an aqueous layer containing water-soluble alkali anthrahydroquinones and a volatile solvent layer containing anthraquinone degradation products, passing said volatile solvent containing anthraquinone degradation products through a filter to remove catalyst particles suspended therein, returning the catalyst for further hydrogenation of additional residue, separating the volatile solvent from the anthraquinone degradation products, recirculating the volatile solvent for admixture with additional residue, passing the aqueous layer through a filter to remove catalyst particles suspended therein, returning the catalyst for further hydrogenation of additional residue, passing air in intimate contact with the aqueous layer to oxidize the water-soluble alkali anthrahydroquinones to anthraquinones insoluble in water, separating the water-insoluble anthraquinones from the aqueous liquor, and returning the aqueous liquor together with additional alkali for admixture with additional residue.

References Cited in the file of this patent

FOREIGN PATENTS

| | | |
|---|---|---|
| 203,895 | Australia | Nov. 4, 1954 |
| 741,499 | Great Britain | Dec. 7, 1955 |